US006879698B2

(12) United States Patent
Boesen

(10) Patent No.: US 6,879,698 B2
(45) Date of Patent: *Apr. 12, 2005

(54) CELLULAR TELEPHONE, PERSONAL DIGITAL ASSISTANT WITH VOICE COMMUNICATION UNIT

(76) Inventor: Peter V. Boesen, 1000 73rd St., Suite 18, Des Moines, IA (US) 50311

( * ) Notice: Subject to any disclaimer, the term of this patent is extended or adjusted under 35 U.S.C. 154(b) by 55 days.

This patent is subject to a terminal disclaimer.

(21) Appl. No.: 09/870,807

(22) Filed: May 31, 2001

(65) Prior Publication Data

US 2001/0024507 A1 Sep. 27, 2001

Related U.S. Application Data

(63) Continuation-in-part of application No. 09/587,743, filed on Jun. 5, 2000, now Pat. No. 6,408,081, which is a continuation of application No. 09/309,107, filed on May 10, 1999, now Pat. No. 6,094,492.

(51) Int. Cl.7 ............................................. H04R 25/00
(52) U.S. Cl. ...................... 381/328; 181/130; 181/135; 381/326; 381/330; 381/312
(58) Field of Search ................................. 381/326, 312, 381/314, 320, 321, 313, 315, 328, 330; 128/1 R, 303 R; 181/130, 135

(56) References Cited

U.S. PATENT DOCUMENTS

| 4,150,262 | A | * | 4/1979 | Ono |
| 5,191,602 | A | | 3/1993 | Regen et al. |
| 5,280,524 | A | | 1/1994 | Norris |
| 5,692,059 | A | * | 11/1997 | Kruger |
| 5,721,783 | A | * | 2/1998 | Anderson .................. 381/328 |
| 5,749,072 | A | | 5/1998 | Mazurkiewicz et al. |
| 5,802,167 | A | | 9/1998 | Hong |
| 5,983,073 | A | | 11/1999 | Ditzik |
| 5,987,146 | A | | 11/1999 | Pluvinage et al. |
| 6,021,207 | A | | 2/2000 | Puthuff et al. |
| 6,048,305 | A | * | 4/2000 | Bauman et al. |
| 6,094,492 | A | | 7/2000 | Boesen |
| 6,112,103 | A | | 8/2000 | Puthuff |
| 6,181,801 | B1 | | 1/2001 | Puthuff et al. |
| 6,643,378 | B2 | * | 11/2003 | Schumaier .................. 381/326 |

FOREIGN PATENT DOCUMENTS

| EP | 0 683 621 A | 11/1995 |
| GB | 2 074 817 A | 11/1981 |

OTHER PUBLICATIONS

Article entitled "5th International Conference on Wearable Computing," by Rick Johnson, Pen Computing Magazine, p. 24, Aug. 2000.

* cited by examiner

Primary Examiner—Huyen Le
Assistant Examiner—Dionne Harvey
(74) Attorney, Agent, or Firm—McKee, Voorhees & Sease, P.L.C.

(57) ABSTRACT

The present invention discloses a method and apparatus for hands free communication using a PDA. The method includes sensing a bone conduction signal from the bone conduction sensor disposed within an external auditory cannel of the user, transmitting the sensed bone conduction signal from a transmitter to a PDA, and processing the sensed bone conduction signal at the PDA to create a processed audio signal.

21 Claims, 3 Drawing Sheets

CELLULAR TELEPHONE, PERSONAL DIGITAL ASSISTANT WITH VOICE COMMUNICATION UNIT

CROSS-REFERENCE TO RELATED APPLICATIONS

This application is a continuation-in-part to U.S. patent application Ser. No. 09/587,743 filed Jun. 5, 2000 U.S. Pat. No. 6,408,081 which is a continuation of U.S. patent application Ser. No. 09/309,107 filed May 10, 1999 and issued as U.S. Pat. No. 6,094,492 on Jul. 25, 2000.

BACKGROUND OF THE INVENTION

1. Field of the Invention

The present invention relates to personal communication systems, including, but not limited to smart phones, PDAs with telecommunications accessories, and cellular or satellite telephones with personal digital assistant capabilities.

2. Problems in the Art

The present invention relates to hands free voice communications with a personal electronic device. Recently, many attempts have been made to combine the functionality of personal digital assistance (PDAs) with cellular telephones. Although the term cellular telephones is used throughout, it is to be understood that this term encompasses satellite telephones and other types of wireless voice communications such as is presently known or may become known. The present invention includes all of these variations in the type of wireless voice communications.

The use of wireless voice communications is still problematic in a number of respects, particularly in respect to hands free communications. In voice communication systems, such as cellular phones, it is more convenient and safer for voice communications to occur without requiring the use of hands. Many attempts have been made at solving this problem, resulting in running of cords between headsets and cellular telephones, heavy and bulky headset units, and related problematic attempts at solutions.

A related problem is the quality of voice communications. As can be appreciated, users are prone to use cellular phones in a variety of different environments with varying amounts of ambient noise that can degrade the quality of voice sound information. One solution to this voice quality problem has been disclosed in U.S. Pat. No. 6,094,492 to Dr. Peter V. Boesen, M.D. herein incorporated by reference in its entirety. To improve upon voice quality, both a bone conduction sensor and an air conduction sensor are used. Processing can occur on the bone conduction sensor sensed signal and the air conduction sensor sensed signal in order to better determine the voice sound information and in order to block out ambient noise or other extraneous information that might be undesirable. Sound processing can be used to improve the signal quality. The complexity and size of the processor used may be related to the complexity of the processing applied to the signals.

For example, additional processing can involve voice recognition. Although some voice recognition may be included on a sound processor located within the ear, locating the sound processor within the ear will increase the size of the device, the complexity, and the cost.

Furthermore, the use of voice recognition is especially desirable when a voice communication system, such as a cellular telephone, is merged with a PDA or a PDA functionality such as in a smart phone, or a PDA with a phone attachment, or other structurally or functionally similar devices.

Thus there are a number of needs not currently being addressed related to hands free voice communication and personal digital assistance and cellular telephones.

Therefore it is a primary object, feature or advantage of the present invention to provide an apparatus which improves upon the state of the art.

It is another object, feature or advantage of the present invention to provide a hands free voice communications apparatus.

It is a further object, feature or advantage of the present invention to provide a hands free voice communications device capable of improved voice communications.

A further object, feature or advantage of the present invention to provide an apparatus capable of voice recognition.

A further object, feature or advantage of the present invention to provide an apparatus capable of reducing the size of an earpiece.

A further object, feature or advantage of the present invention to provide an apparatus for personal hands free voice communications that reduces the complexity of a hands free earpiece.

A further object, feature or advantage of the present invention to provide a hands free voice communications apparatus that reduces the cost of a hands free earpiece.

These and other objects, features or advantages of the present invention will become apparent from the specification and claims.

BRIEF SUMMARY OF THE INVENTION

The present invention is an apparatus that provides for improved sound processing of a voice communications signal and a PDA while reducing the size of a hands free earpiece.

BRIEF DESCRIPTION OF THE DRAWINGS

The present invention is illustrated by way of example and not limitation and the figures of the accompanying drawings, and references indicate similar elements and in which.

DETAILED DESCRIPTION OF THE INVENTION

The present invention will now be described as it applies to an exemplary embodiment. It is not intended that the present invention be limited to the described embodiment. It is intended that the invention cover all modifications and alternatives which may be included within the spirit and scope of the invention.

Figure 1:
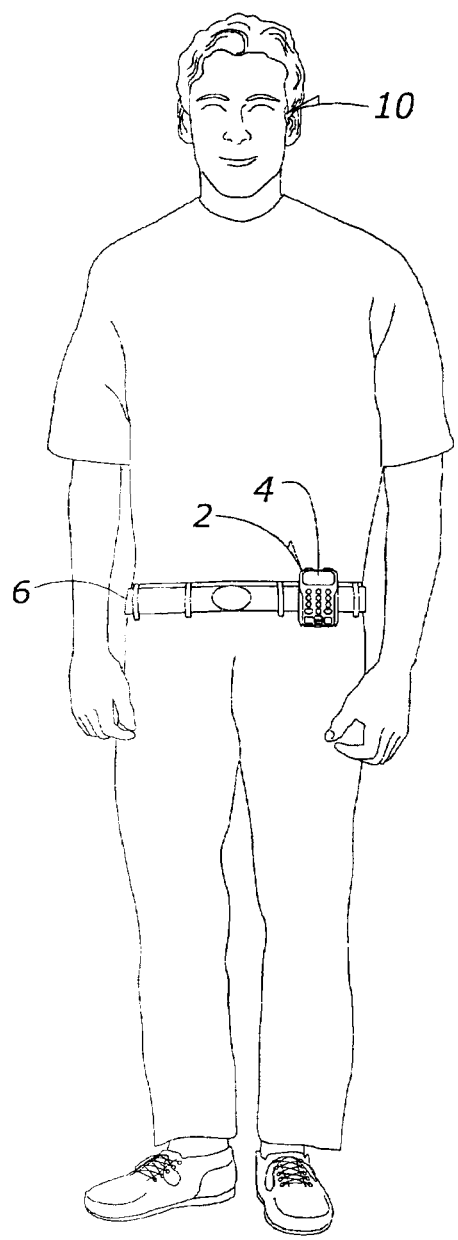
FIG. 1 is a diagram of a personal electronic device worn by a person according to the present invention.

FIG. 1 shows the personal electronic system of the present invention as warn by a person. The personal communication system as shown has a display 4 such as a LCD panel or other data display module such as may be found in a cellular telephone or PDA. The device 2 may be worn on a belt 6 as shown or be placed in a pocket or may be otherwise carried by a person. A part of the system includes the earpiece 10 worn by the person.

Figure 2:
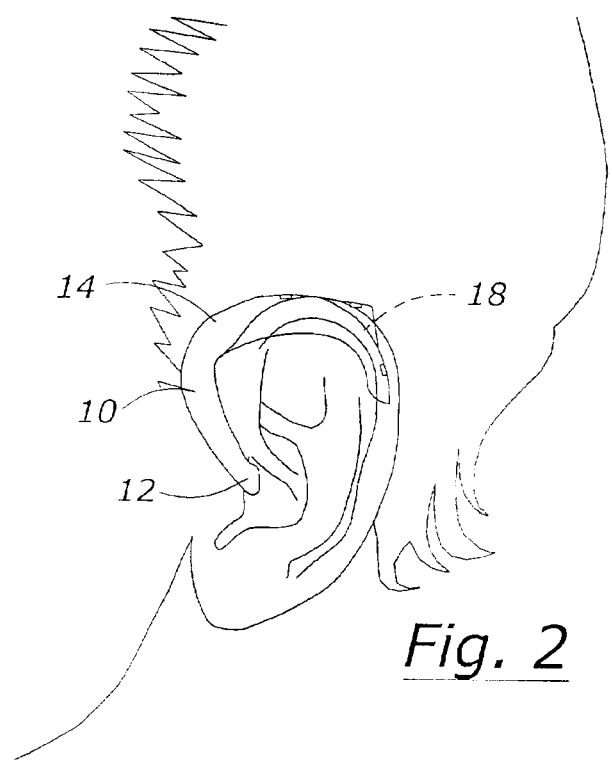
FIG. 2 is a representation of the earpiece of the present invention fitted on the ear.

FIG. 2 shows a pictorial representation of the earpiece 10 as worn in a person's ear. The earpiece has an external ear canal portion 12 that is fitted within the ear. The earpiece 10 has an ear attachment portion 14 fitted around the ear. The earpiece 10 in its preferred form houses a transceiver 18.

Figure 3:
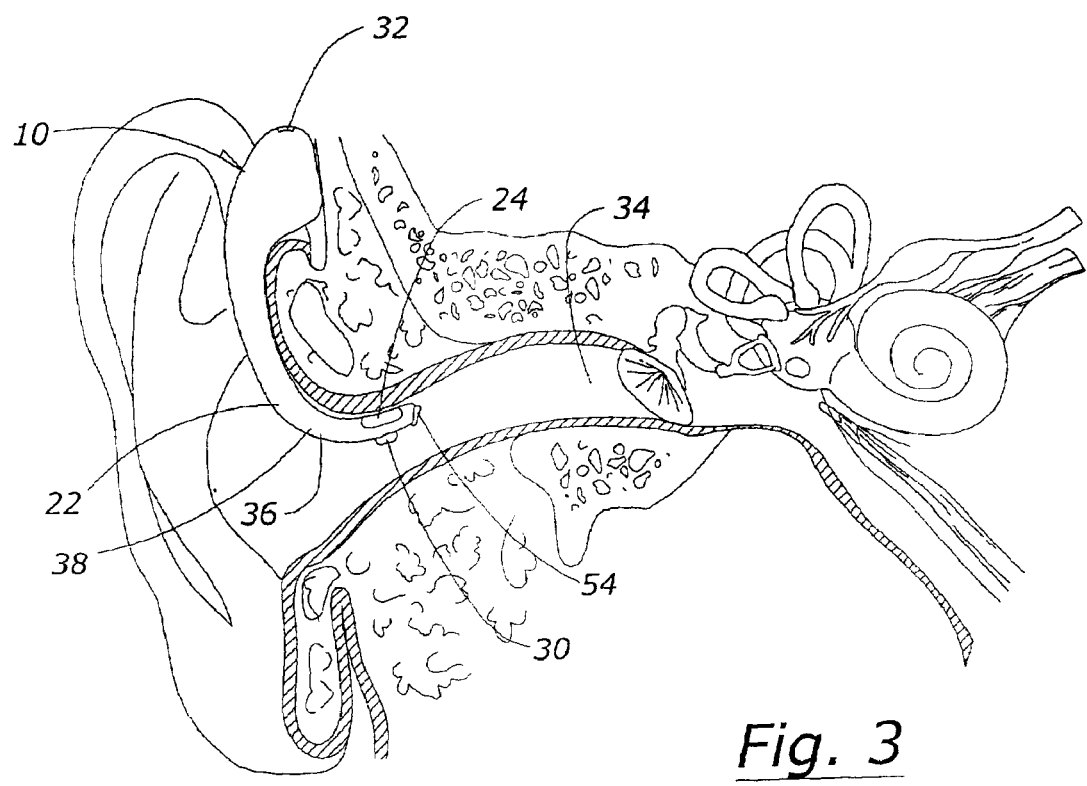
FIG. 3 is a diagram of the earpiece of the present invention fitted within an ear.

FIG. 3 discloses an example of the earpiece 10 of the present invention as worn in the ear. The earpiece 10 is designed to be worn at the ear. An external canal portion 34 of the earpiece includes a bone conduction sensor 24 and an air conduction sensor 30 located on a resilient member 36. In this manner, the bone conduction sensor 24 and the air conduction sensor 30 are located within the external auditory canal 34. As shown, a portion of the earpiece is adapted to be fitted to the contours of a posterior superior wall of the external auditory canal. The bone conduction sensor is adapted to operatively contact a portion of the external auditory canal adjacent the mastoid bone to convert bone vibrations of voice sound information into electrical signals. The air conduction sensor 30 provides for air vibrations within the external auditory canal 34 to be received and to also be converted into electrical signals. An antenna 32 of the earpiece 10 is also shown. The present invention contemplates that the placement of the antenna as well as other portions of the earpiece device may vary.

Figure 4:
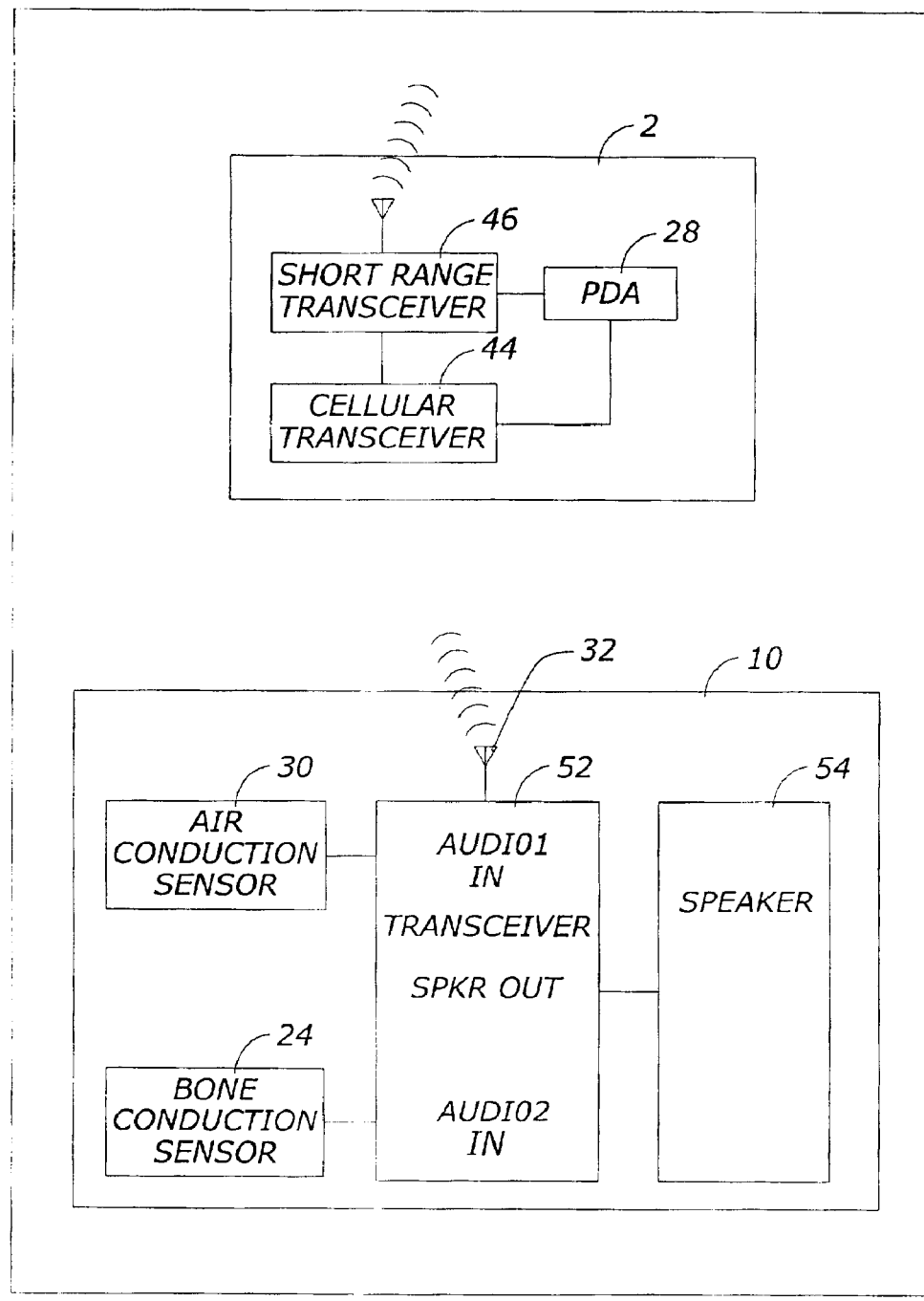
FIG. 4 is a diagram of the personal electronic device of the present invention.

FIG. 4 provides a diagram of the system of the present invention. The system includes the PDA portion 2 as well as the earpiece portion 10. An earpiece portion 10, the air conduction sensor 30 and the bone conduction sensor 24 are in operative connection with a transceiver 52. Although a single stereo transceiver is shown, the present invention also contemplates that multiple transceivers could be used to transmit the air conduction signal and the bone conduction signal on separate channels. The present invention also contemplates that the air conduction sensor and the bone conduction sensor signals can be combined in any number of ways so that they may be transmitted from a single transceiver and then received and separated. In addition, an optional speaker 54 is shown. The present invention further contemplates that the speaker need not be located within the earpiece.

The PDA portion 2 includes both a PDA 28 and a cellular transceiver 44. It should be apparent that the present invention contemplates any number of PDA/cellular or satellite telephone combinations. This includes both smart phones as well as PDA's with wireless voice communication attachments. The present invention contemplates any number of other wireless voice devices with PDA functionality. PDA functionality includes functions such as an organizer, an address book, a note pad, a calendar, and any other number of functionalities. For example, a PDA may function running under the Windows CE operating system, the EPOC operating system, the PALM operating system, the Symbion operating system, but is in no way limited to a particular type of operating system run by the PDA and/or the cellular telephone. Similarly, the present invention can include any number of processors capable of performing the functions described. For example, an ARMs processor may be used. The short-range transceiver 46 is in communication with the earpiece transceiver 32. In this manner, wireless information including a signal from the air conduction sensor and a signal from the bone conduction sensor can be transmitted from the earpiece to the PDA portion of the device.

Further, once the PDA portion of the device receives this information, the PDA 28 may apply any number of sound processing algorithms to the received information. For example, where both an air conduction signal and a bone conduction signal are received by the PDA, the PDA may simply mix the two signals, the PDA may mix the two signals in varying proportions dependent upon the type of voice sound information desired. Similarly, the PDA may apply filters to one of the signals derived from the other signal and numerous other digital signal processing algorithms and methods such as may be appropriate for a particular desired result. It should be apparent that the PDA 28 may have more processing power than a small processor located within the earpiece would.

The system of the present invention includes a number of advantages. It provides for the ability to process information received from both an air conduction sensor and a bone conduction sensor at a PDA. This information may be processed to support voice recognition and/or voice activation. In addition, this reduces the need for processing within the earpiece itself, thereby reducing the cost and the size of the earpiece while increasing the processing capabilities available to process the sensed sound information. In addition, due to the improved processing ability, hands free voice communications are improved over that which would be possible by merely using a PDA or an earpiece associated with a PDA.

Therefore an improved system for hands free voice communication for use with a PDA and wireless voice communication device has been disclosed. The present invention includes numerous variations on the types of sensors used, the type of PDA and the type of cellular transceiver used, the type of short range transceiver used, and numerous other variations such as may logically be apparent to one skilled in the art.

What is claimed is:

1. A method for hands free voice communications using a personal communications device comprising:
   sensing a bone conduction signal from a bone conduction sensor fitted to the contours of a posterior superior wall of an external auditory canal of a user such that the posterior inferior wall of the external auditory canal remains unobstructed to allow ambient sound into the external auditory canal and to avoid an occlusive effect;
   transmitting the sensed bone conduction signal from a transmitter to the personal communications device; and
   processing the sensed bone conduction signal at the personal communications device to create a processed audio signal.

2. The method of claim 1 wherein the personal communications device includes a PDA.

3. The method of claim 1 further comprising transmitting the processed audio signal from the personal communications device over a cellular transceiver.

4. The method of claim 1 further comprising transmitting the processed audio signal from the personal communications device to a receiver disposed within an earpiece worn by the user; and sending the processed audio signal from the receiver to a speaker disposed within the earpiece.

5. The method of claim 1 further comprising performing a yoke recognition function using the processed signal.

6. The method of claim 1 further comprising performing a voice activation function using the processed signal.

7. A method for hands free voice communications using a personal communications device comprising:
   sensing an air conduction signal from an air conduction sensor nonocclusively disposed within an external auditory canal of a user such that at least one wall of the external auditory canal remains unobstructed;

sensing a bone conduction signed from a bone conduction sensor nonocclusively disposed within the external auditory canal of the user and positioned against a posterior superior wall of the external auditory canal;

transmitting the sensed air conduction signal and the sensed bone conduction signal from a transmitter located in an earpiece to a personal communications device; and processing the sensed air conduction signal and the sensed bone conduction signal at the personal communications device to create a processed audio signal.

8. The method of claim 7 further comprising transmitting the processed audio signal from the personal communications device over a cellular transceiver.

9. The method of claim 7 further comprising transmitting the processed audio signal from the personal communications device to a receiver disposed within an earpiece worn by the user; and sending the processed audio signal from the receiver to a speaker disposed within the earpiece.

10. The method of claim 7 further comprising performing a voice recognition function using the processed signal.

11. The method of claim 7 further comprising performing a voice activation function using the processed signal.

12. A method for hands free voice communications using a personal communications device comprising:

sensing an air conduction signal from an air conduction sensor proximate an external auditory canal of a user;

sensing a bone conduction signal from a bone conduction sensor fitted to a posterior superior wall of the external auditory canal of a user such that at least one wall of the external auditory canal remains unobstructed;

transmitting the air conduction signal and the bone conduction signal from a transmitter disposed within an earpiece to a personal communications device; and processing the bone conduction signal and the air conduction signal at the personal communications device to create a processed audio signal.

13. The method of claim 12 wherein the air conduction sensor is in a position proximate the posterior superior wall of the external auditory canal and an opposite wall is unobstructed.

14. The method of claim 12 wherein the personal communications device includes a PDA.

15. The method of claim 12 further comprising transmitting the processed audio signal from the personal communications device over a cellular transceiver.

16. The method of claim 12 further comprising transmitting the processed audio signal from the personal communications device to a receiver disposed within an earpiece worn by the user; and sending the processed audio signal from the receiver to a speaker disposed within the earpiece.

17. The method of claim 12 further comprising performing a voice recognition function using the processed signal.

18. The method of claim 12 further comprising performing a voice activation function using the processed signal.

19. A system for hands free voice communication using the processing capabilities of a personal communications device comprising:

an earpiece housing;

an air conduction sensor adapted to be nonocclusively disposed within an external auditory canal of a user and operatively connected to the earpiece housing and capable of transducing air conduction signals;

a bone conduction sensor adapted to be nonocclusively disposed within an external auditory canal of a user and operatively connected to the earpiece housing and capable of transducing bone conduction signals;

a transmitter operatively connected to the air conduction sensor and the bone conductor sensor and attached to the earpiece housing for simultaneously transmitting the air conduction signals and the bone conduction signals;

a personal communications device having a processor adapted for processing audio signals; and a receiver electrically connected to the personal communications device for receiving the air conduction signals and the bone conduction signals.

20. The system of claim 19 further comprising a cellular transceiver electrically connected to the personal communications device for transmitting processed audio signals.

21. The system of claim 19 further comprising a speaker attached to the earpiece housing; a second receiver attached to the earpiece housing and the speaker; and a second transmitter operatively connected to the personal communications device adapted to transmit the processed audio signals to the second receiver.

* * * * *

UNITED STATES PATENT AND TRADEMARK OFFICE
CERTIFICATE OF CORRECTION

PATENT NO. : 6,879,698 B2
DATED : April 12, 2005
INVENTOR(S) : Boesen, Peter V.

It is certified that error appears in the above-identified patent and that said Letters Patent is hereby corrected as shown below:

Column 4,
Line 59, should read -- a voice recognition function using the processed signal. --

Signed and Sealed this

Nineteenth Day of July, 2005

JON W. DUDAS
*Director of the United States Patent and Trademark Office*